United States Patent
Lee et al.

(10) Patent No.: US 8,103,555 B2
(45) Date of Patent: Jan. 24, 2012

(54) USER RECOMMENDATION METHOD AND RECORDED MEDIUM STORING PROGRAM FOR IMPLEMENTING THE METHOD

(75) Inventors: Eunseok Lee, Gyeonggi-do (KR); Jehwan Oh, Gyeonggi-do (KR); Seunghwa Lee, Gyeonggi-do (KR); MinChul Jung, Gyeonggi-do (KR)

(73) Assignee: Sungkyunkwan University Foundation for Corporate Collaboration, Gyeonggi-do (KR)

( * ) Notice: Subject to any disclaimer, the term of this patent is extended or adjusted under 35 U.S.C. 154(b) by 230 days.

(21) Appl. No.: 12/325,972

(22) Filed: Dec. 1, 2008

(65) Prior Publication Data

US 2009/0313086 A1     Dec. 17, 2009

(30) Foreign Application Priority Data

Jun. 16, 2008   (KR) .......................... 10-2008-0056554

(51) Int. Cl.
  *G06Q 30/00* (2006.01)
(52) U.S. Cl. ..................................... 705/26.7; 705/27.1
(58) Field of Classification Search .................... 705/26, 705/27, 26.1–27.2
  See application file for complete search history.

(56) References Cited

U.S. PATENT DOCUMENTS

| | | | |
|---|---|---|---|
| 6,266,649 B1 * | 7/2001 | Linden et al. .................... | 705/26 |
| 2002/0042793 A1 * | 4/2002 | Choi ................................ | 707/6 |
| 2006/0167757 A1 * | 7/2006 | Holden et al. .................... | 705/26 |

OTHER PUBLICATIONS

Choi, Jeewon; Seol, Hyeonjoo; Lee, Sungjoo; Cho, Hyunmyung; Park, Yongtae Internet Research; v18n3; pp. 313-335 2008.*
"*A Novel Recommendation System based on improved user behavior analysis and weighted item attribute*", Proceedings of 2008 Korea Conference on Software Engineering, vol. 10 No. 1, p. 443-450.
Office Action mailed Mar. 18, 2010 for Korean Patent Application No. 10-2008-0056554.
Society of Korea Industrial Systems Engineering, May 16, 2003, "On-line Recommendation Agent System using Human Sensibility Ergonomics".

* cited by examiner

*Primary Examiner* — Jeffrey A Smith
*Assistant Examiner* — Resha Desai
(74) *Attorney, Agent, or Firm* — James P. Muraff; Neal, Gerber & Eisenberg LLP (57) ABSTRACT

A method of recommendation to a user is disclosed. In the method in accordance with an embodiment of the present invention, a recommendation system recommends a product to a user of an e-commerce site, which sells the product through the Internet. The method can include: collecting user behavior information of the user; analyzing the collected user behavior information; creating a recommendation tree for predicting a user preference for a certain product based on the analyzing; and recommending the product to the user based on the recommendation tree. The user behavior information is a command signal inputted by the user in the e-commerce site while the user is accessed to the e-commerce site, and the product can be classified into a plurality of items, which represent the product. The method in accordance with the present invention can analyze the user's preferences more quickly and accurately without inconveniencing the user.

8 Claims, 4 Drawing Sheets

| id | Item_num | User_name | Item_color | Item_price | Item_category | Item_material | Itme_style | Add_zoom | Add_cart | Add_buy |
|---|---|---|---|---|---|---|---|---|---|---|
| 50 | 205 | ya23ma | 10 | 5 | 3 | 5 | 0 | 1 | 1 | 1 |
| 51 | 295 | ya23ma | 1 | 3 | 3 | 4 | 0 | 0 | 0 | 0 |
| 52 | 218 | ya23ma | 1 | 4 | 3 | 3 | 0 | 1 | 0 | 0 |
| 53 | 215 | ya23ma | 1 | 5 | 1 | 2 | 0 | 1 | 1 | 1 |
| 54 | 203 | ya23ma | 10 | 4 | 3 | 5 | 0 | 0 | 0 | |
| 55 | 214 | Jbmania | 1 | 5 | 1 | 4 | 0 | 0 | 0 | |
| 56 | 267 | Jbmania | 1 | 1 | 2 | 4 | 0 | 1 | 0 | 1 |
| 57 | 271 | Jbmania | 1 | 2 | 1 | 4 | 0 | 1 | 0 | 0 |
| 58 | 214 | Jbmania | 1 | 3 | 1 | 5 | 0 | 1 | 0 | 0 |
| 59 | 289 | Jbmania | 1 | 2 | 2 | 3 | 0 | 0 | 0 | 0 |
| 60 | 204 | Jbmania | 10 | 3 | 2 | 4 | 0 | 1 | 0 | 1 |
| 61 | 292 | HIDE | 1 | 4 | 1 | 5 | 0 | 1 | 1 | 0 |
| 72 | 274 | HIDE | 11 | 2 | 2 | 4 | 0 | 0 | 0 | 0 |
| 73 | 289 | HIDE | 1 | 3 | 1 | 3 | 0 | 1 | 0 | 0 |
| 74 | 540 | HIDE | 6 | 3 | 3 | 5 | 0 | 0 | 0 | 0 |
| 75 | 215 | HIDE | 1 | 3 | 1 | 4 | 0 | 1 | 1 | 1 |
| 76 | 203 | HIDE | 10 | 4 | 3 | 4 | 0 | 0 | 1 | 0 | user tuple

| | 10 | 20 | 30 | 40 | 50 | 60 | 70 | 80 | 90 | 100 |
|---|---|---|---|---|---|---|---|---|---|---|
| 1 | Item2 : 0.046 | Item2 : 0.008 | Item2 : 0.032 | Item2 : 0.034 | Item2 : 0.028 | Item1 : 0.26 | Item17 : 0.204 | Item2 : 0.178 | Item17 : 0.163 | Item2 : 0.131 |
| 2 | Item17 : 0.046 | Item1 : 0.008 | Item17 : 0.032 | Item1 : 0.034 | Item17 : 0.028 | Item2 : 0.26 | Item4 : 0.185 | Item4 : 0.165 | Item2 : 0.155 | Item17 : 0.13 |
| 3 | Item1 : 0.023 | Item10 : 0.008 | Item1 : 0.024 | Item17 : 0.034 | Item1 : 0.028 | Item17 : 0.249 | Item1 : 0.164 | Item1 : 0.163 | Item1 : 0.15 | Item3 : 0.122 |
| 4 | Item4 : 0.023 | Item17 : 0.008 | Item4 : 0.016 | Item5 : 0.026 | Item12 : 0.028 | Item15 : 0.187 | Item2 : 0.164 | Item17 : 0.153 | Item4 : 0.139 | Item1 : 0.118 |
| 5 | Item7 : 0.023 | Item4 : 0.004 | Item5 : 0.016 | Item7 : 0.026 | Item4 : 0.028 | Item6 : 0.176 | Item12 : 0.159 | Item3 : 0.136 | Item3 : 0.124 | Item4 : 0.113 |
| 6 | Item8 : 0.023 | Item3 : 0.004 | Item11 : 0.016 | Item4 : 0.026 | Item5 : 0.021 | Item8 : 0.15 | Item14 : 0.12 | Item6 : 0.128 | Item6 : 0.117 | Item11 : 0.1 |
| 7 | Item9 : 0.023 | Item5 : 0.004 | Item12 : 0.016 | Item11 : 0.026 | Item7 : 0.021 | Item12 : 0.127 | Item7 : 0.119 | Item14 : 0.121 | Item14 : 0.114 | Item8 : 0.097 |
| 8 | Item12 : 0.023 | Item6 : 0.004 | Item13 : 0.016 | Item12 : 0.026 | Item11 : 0.021 | Item5 : 0.116 | Item11 : 0.119 | Item20 : 0.116 | Item10 : 0.106 | Item6 : 0.094 |
| 9 | Item14 : 0.023 | Item7 : 0.004 | Item10 : 0.008 | Item13 : 0.026 | Item13 : 0.021 | Item19 : 0.116 | Item15 : 0.119 | Item13 : 0.097 | Item13 : 0.09 | Item14 : 0.093 |
| 10 | Item18 : 0.023 | Item8 : 0.004 | Item3 : 0.008 | Item14 : 0.026 | Item14 : 0.021 | Item13 : 0.11 | Item18 : 0.119 | Item9 : 0.097 | Item9 : 0.09 | Item10 : 0.087 |
| 11 | Item19 : 0.023 | Item9 : 0.004 | Item6 : 0.008 | Item18 : 0.026 | Item15 : 0.021 | Item9 : 0.11 | Item6 : 0.114 | Item5 : 0.09 | Item7 : 0.086 | Item7 : 0.083 |
| 12 | Item3 : 0 | Item11 : 0.004 | Item7 : 0.008 | Item19 : 0.026 | Item18 : 0.021 | Item10 : 0.105 | Item3 : 0.1 | Item7 : 0.09 | Item18 : 0.086 | Item18 : 0.083 |
| 13 | Item5 : 0 | Item12 : 0.004 | Item8 : 0.008 | Item15 : 0.017 | Item19 : 0.021 | Item14 : 0.101 | Item10 : 0.091 | Item11 : 0.09 | Item5 : 0.082 | Item5 : 0.075 |
| 14 | Item6 : 0 | Item13 : 0.004 | Item9 : 0.008 | Item10 : 0.009 | Item10 : 0.014 | Item4 : 0.101 | Item13 : 0.076 | Item18 : 0.09 | Item11 : 0.082 | Item9 : 0.063 |
| 15 | Item10 : 0 | Item14 : 0.004 | Item14 : 0.008 | Item3 : 0.009 | Item8 : 0.014 | Item7 : 0.088 | Item5 : 0.076 | Item8 : 0.085 | Item15 : 0.082 | Item13 : 0.062 |
| 16 | Item11 : 0 | Item15 : 0.004 | Item15 : 0.008 | Item6 : 0.009 | Item9 : 0.014 | Item11 : 0.088 | Item8 : 0.076 | Item15 : 0.085 | Item8 : 0.078 | Item12 : 0.062 |
| 17 | Item13 : 0 | Item18 : 0.004 | Item18 : 0.008 | Item8 : 0.009 | Item3 : 0.007 | Item18 : 0.088 | Item9 : 0.076 | Item10 : 0.072 | Item12 : 0.065 | Item15 : 0.055 |
| 18 | Item15 : 0 | Item16 : 0.004 | Item16 : 0.008 | Item9 : 0.009 | Item6 : 0.007 | Item3 : 0.079 | Item19 : 0.076 | Item16 : 0.06 | Item19 : 0.058 | Item20 : 0.05 |
| 19 | Item16 : 0 | Item19 : 0.004 | Item19 : 0.008 | Item16 : 0.009 | Item16 : 0.007 | Item20 : 0.023 | Item16 : 0.073 | Item19 : 0.059 | Item20 : 0.057 | Item19 : 0.041 |
| 20 | Item20 : 0 | Item20 : 0.004 | Item20 : 0.008 | Item20 : 0.009 | Item20 : 0.007 | Item16 : 0.011 | Item20 : 0.03 | Item20 : 0.026 | Item16 : 0.022 | Item16 : 0.019 |

USER RECOMMENDATION METHOD AND RECORDED MEDIUM STORING PROGRAM FOR IMPLEMENTING THE METHOD

CROSS-REFERENCE TO RELATED APPLICATION

This application claims the benefit of Korean Patent Application No. 10-2008-0056554, filed with the Korean Intellectual Property Office on Jun. 16, 2008, the disclosure of which is incorporated herein by reference in its entirety.

TECHNICAL FIELD

The present invention relates to a recommendation method for users and a recording medium storing a program for realizing the method, which is used for an e-commerce site.

BACKGROUND

With the rapid development of information and communication technologies, the information on the web has grown explosively. Accordingly, a large number of researches are underway to accurately identify and provide the information users want. In particular, for activating commerce in the field of e-commerce, researches for a recommendation system, which provides the users the appropriate product information based on the user's preferences, have become an important issue.

Accurately analyzing the user preferences is essential so as to provide accurate and effective recommendation information in the recommendation system. How to analyze the user preferences can include an explicit analysis and an implicit analysis. The explicit analysis method obtains information about the user preferences by analyzing the user information or product evaluation inputted by the user. The explicit analysis has an advantage of getting information directly from the user so that the analyzing of the user preferences is faster, but it inconveniences the user. Moreover, if the user does not answer to queries correctly, it can decrease the accuracy.

The implicit analysis is a method that infers the user preferences through a variety of information about the user's behavior, and thus it is preferable to the explicit analysis since it can make an analysis without inconveniencing the user. However, the problem is that it requires more time for the analysis since it needs to gather sufficient amount of information about the user's behavior for a correct analysis.

Recently, a combined form of analysis, which mixes the above two analytical methods, has been commercially available to analyze the user preferences. That is, when the user initially visits a store, the user' behavior will be monitored by explicitly inquiring what the user is interested in and then by analyzing the user preferences based on the user's behavior, effectively reducing the time taken to analyze the user preferences with the implicit analysis. However, this analytical method also requires the user's explicit answers to the queries, thereby causing inconvenience to the user.

In addition, most of the existing recommendation systems only consider a single overall assessment item on products when analyzing the user's preferred products based on the user's behavior information. Therefore, it is difficult to determine whether it is relevant to why the user prefers a particular product.

SUMMARY

An aspect of the present invention provides a user recommendation system that can analyze information about a user's implied preferences based on the user's behavior.

In addition, the present invention provides an improved user recommendation system that can determine the relationship between the user preferences and product features by applying multiple items of products on the user recommendation system.

Another aspect of the invention provides a user recommendation method. In the method in accordance with an embodiment of the present invention, a recommendation system recommends a product to a user of an e-commerce site, which sells the product through the Internet. The method can include: collecting user behavior information of the user; analyzing the collected user behavior information; creating a recommendation tree for predicting a user preference for a certain product based on the analyzing; and recommending the product to the user based on the recommendation tree. The user behavior information is a command signal inputted by the user in the e-commerce site while the user is accessed to the e-commerce site, and the product can be classified into a plurality of items, which represent the product.

Here, the analyzing of the collected user behavior information can include: computing the a user preferences on each of the plurality of items through by use of the user behavior information; and calculating a conditional probability value for each of elements belonging to included in the plurality of items. The computing of the user preference uses an ID 3 algorithm and can include: calculating a usefulness of the user behavior information; and computing the user preference based on the usefulness of the user behavior information, in which an equation for computing the user preference is Entropy(S)=$-p_{u\geq3} \log_2 p_{u\geq3} - p_{u<3} \log_2 p_{u<3}$, and in which the user preference is expressed as Entropy(S), a probability when the usefulness of the user behavior information is greater than or equal to 3 is expressed as $P_{u\geq3}$, and a probability when the usefulness of the user behavior information is smaller than 3 is expressed as $p_{u<3}$.

In addition, the creating of the recommendation tree can include: forming a hierarchy level by arranging the plurality of items in a descending order of the user preference; and arranging the elements in a descending order of the conditional probability value, in which the elements are included in the plurality of items. The recommending of the product to the user based on the recommendation tree can include: calculating a similarity between the user preference and the product; and recommending the product to the user in a descending order of the similarity.

Then, the calculating of the similarity can include: computing a unit similarity by multiplying the preference of a hierarchy level and the conditional probability value of the element, in which the element corresponds to the product disposed in the hierarchy level; and computing the similarity by adding the unit similarities.

Yet, another aspect of the invention provides a recorded medium having recorded a program executing a method of recommending a product to a user of an e-commerce site selling the product through the Internet, in which the product is recommended by a user recommendation system, and in which the recorded medium is readable by a computer. The method includes: collecting user behavior information of the user; analyzing the collected user behavior information; creating a recommendation tree for predicting a user preference of the user for a certain product based on the analyzing; and recommending the product to the user based on the recommendation tree, in which the user behavior information is a command signal inputted while the user is accessed to the e-commerce site, and the product is classified into a plurality of items representing the product.

Here, the analyzing of the collected user behavior information can include: computing a user preference on each of the plurality of items by use of the user behavior information; and calculating a conditional probability value for each of element included in the plurality of items. The computing of the user preference uses an ID 3 algorithm and can include: calculating a usefulness of the user behavior information; and computing the user preference based on the usefulness of the user behavior information, in which an equation for computing the user preferences is Entropy(S)=$-p_{u \geq 3} \log_2 p_{u \geq 3} - p_{u<3} \log_2 p_{u<3}$, and in which the user preference is expressed as Entropy(S), a probability when the usefulness of the user behavior information is greater than or equal to 3 is expressed as $P_{u \geq 3}$, and a probability when the usefulness of the user behavior information is smaller than 3 is expressed as $p_{u<3}$.

In addition, the creating of the recommendation tree can include: forming a hierarchy level by arranging the plurality of items in a descending order of the user preference; and arranging the elements in a descending order of the conditional probability value, in which the elements are included in the plurality of items. The recommending of the product to the user based on the recommendation tree can include: calculating a similarity between the user preference and the product; and recommending the product to the user in a descending order of the similarity.

Then, the calculating of the similarity can include: computing a unit similarity by multiplying the preference of a hierarchy level and the conditional probability value of the element, in which the element corresponds to the product disposed in the hierarchy level; and computing the similarity by adding the unit similarities.

Additional aspects and advantages of the present invention will be set forth in part in the description which follows, and in part will be obvious from the description, or may be learned by practice of the invention.

A better understanding of the objects, advantages, features, properties and relationships of the invention will be obtained from the following detailed description and accompanying drawings which set forth at least one illustrative embodiment and which are indicative of the various ways in which the principles of the invention may be employed.

BRIEF DESCRIPTION OF THE DRAWINGS

FIG. 4 is a table showing a recommendation ranking in accordance with the number of user's behavior information in a user recommendation method in accordance with an embodiment of the present invention.

DETAILED DESCRIPTION

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Certain embodiments of the present invention will be described below in detail with reference to the accompanying drawings.

Figure 1:
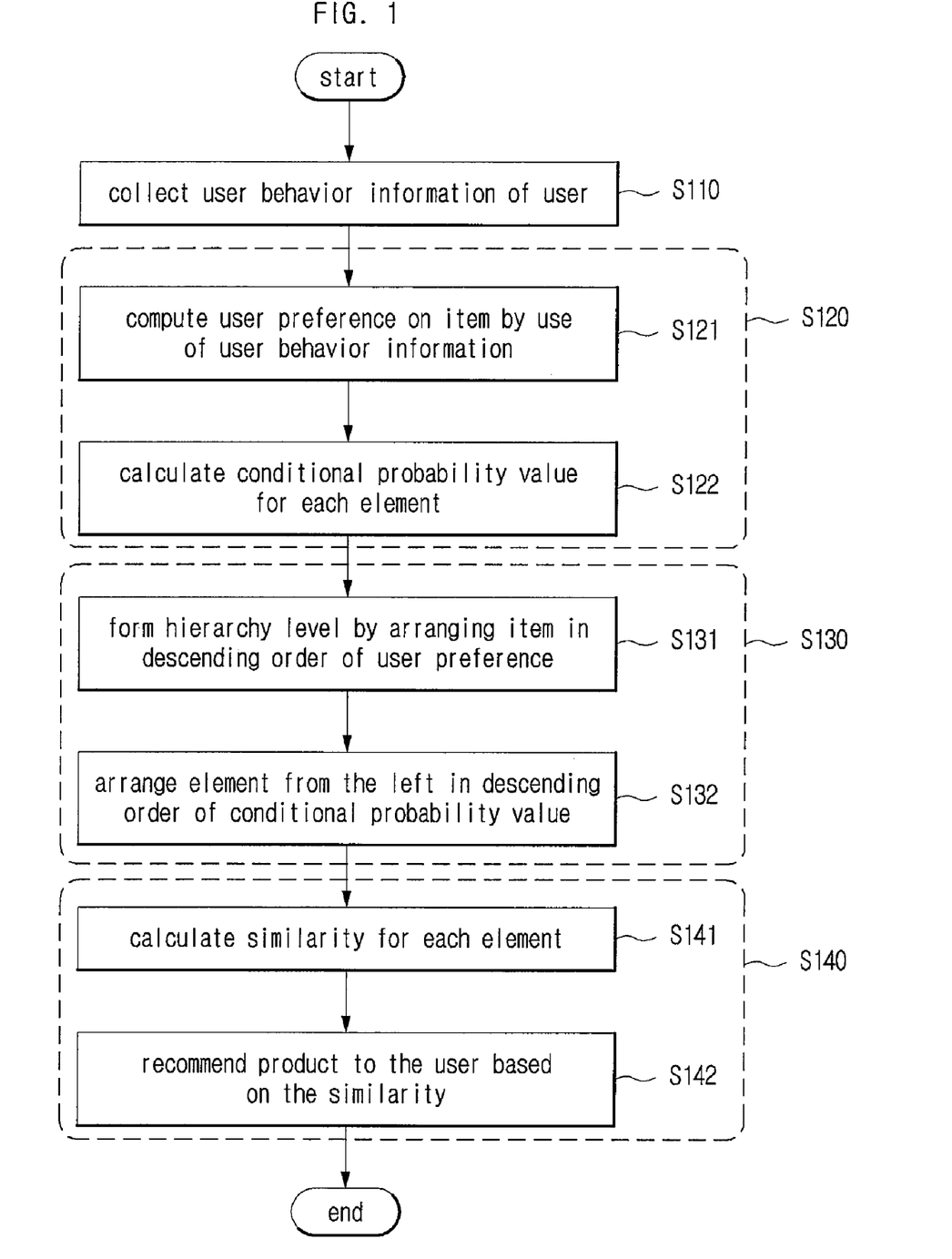
FIG. 1 shows a control flow of a user recommendation method of an e-commerce site in accordance with an embodiment of the present invention.

A recommendation method for users in an e-commerce site in accordance with an embodiment of the present invention will be described with reference to FIG. 1. FIG. 1 is a flow chart showing how a user recommendation method of an e-commerce site is controlled in accordance with an embodiment of the present invention.

A user recommendation system connected to an e-commerce site or a web server hosting the e-commerce site will be mainly described hereinafter. However, it shall be evident to those of ordinary skill in the art that the user recommendation system can be implemented with several combinations of programs that perform functions in each step described below.

Figure 2:
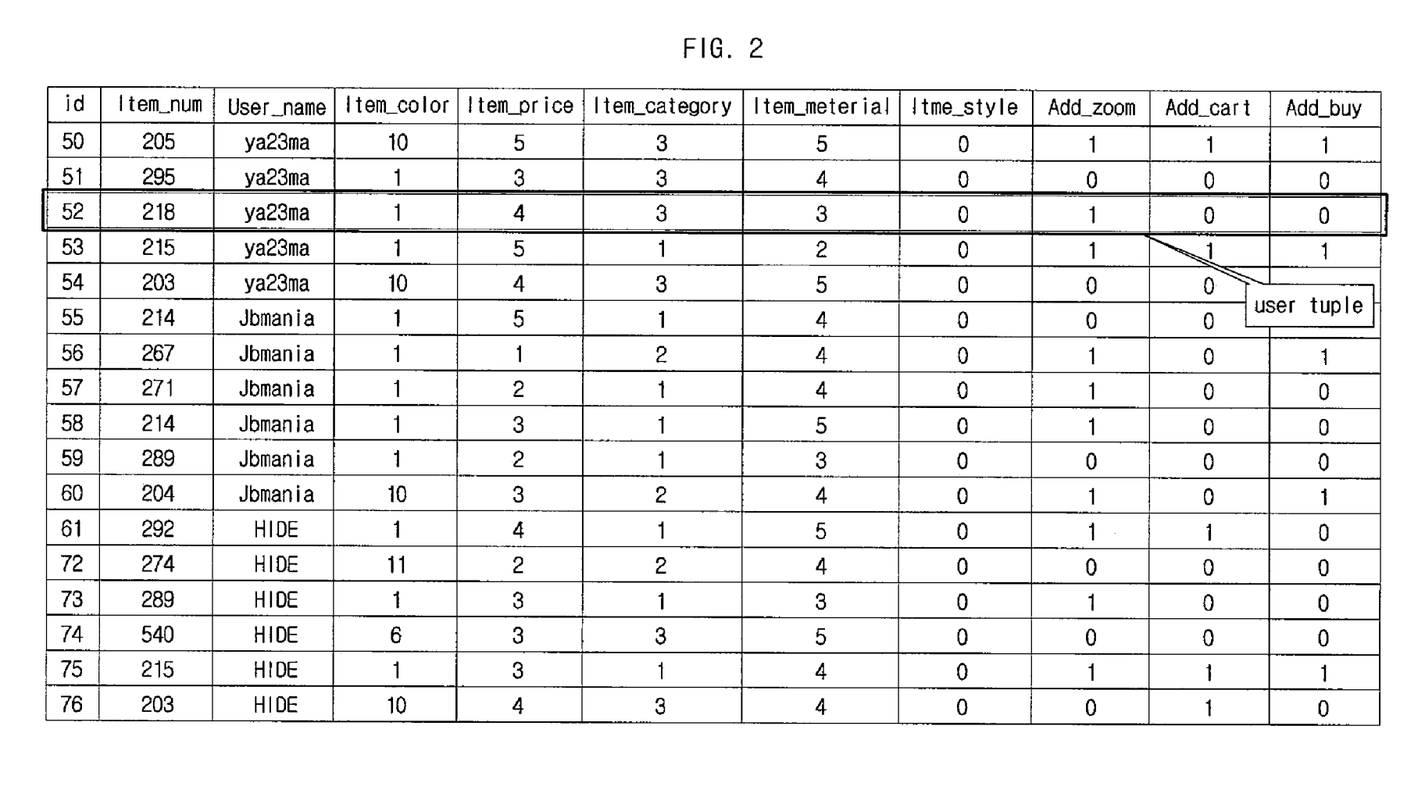
FIG. 2 is an example showing a user's behavior information of a user recommendation method in accordance with an embodiment of the present invention.

First of all, the user recommendation system of an e-commerce site collects user behavior information about a user's user behavior in order to provide recommendation product information to the user (S110). The user behavior information is a command signal inputted by the user in an e-commerce site while the user is visiting the e-commerce site. It can be a command signal being inputted, for example, clicking on a product item, zooming in an image, placing an item in a shopping cart or buying an item immediately, through an input device such as a keyboard or a mouse by the user accessing the e-commerce site. The user behavior information used hereinafter will refer to the same meaning as described above. In accordance with the present embodiment, the duration between the user accessing the e-commerce site and the user terminating the access of the e-commerce site can be the period between the user logging in the e-commerce site and the user logging out of the e-commerce site. After the user logs in the e-commerce site, the user behavior information can be collected in accordance with a product selected by the user, as illustrated in FIG. 2. This will be described later with reference to FIG. 2.

Here, the product being sold in the e-commerce site can be classified into a plurality of items which represent the product. For example, if accessories are sold in the e-commerce site, the accessories can be categorized into 5 items, including category, which represents the kinds such as necklaces, earrings and bracelets, price, color, material and style. As such, the plurality of items can represent the characteristic of one product. In accordance with this embodiment, for a product, the information on a plurality of items representing the features of the product and the user's user behavior information for the product can be collected.

For the convenience of describing the user recommendation method, it will be assumed hereinafter that the e-commerce site is selling accessories.

Next, the collected user behavior information is analyzed (S120). In accordance with an embodiment of the present invention, the analyzing of the user behavior information can include computing the user preferences (S121) and calculating a conditional probability value for each of the elements included in the plurality of items (S122). The analyzing of the user behavior information (S120) can be performed by using an ID 3 algorithm.

The root of tree categorizers, the ID 3 algorithm is a widely used conventional tree categorizer in the field of machine learning. It is a category rule algorithm, which is represented as a tree, while performing an inductive work as one of the decision trees. The ID 3 algorithm creates branches by taking all values that the attributes can have, while one of the attributes is selected as a root node of the tree. The ID 3 algorithm is well-known to those or ordinary skill in the art, and thus detailed description will omitted.

Here, the word 'element' is a value included in a certain product's item. The word 'element' in this context refers to a rank, a property and a category in accordance with a certain item. For example, if the product 'accessory' includes a category, a price and a color in its items, elements such as a necklace, an earring and a bracelet can be included in the item 'category', elements such as a high-class, a middle-class and a low-class can be included in the item 'price', and elements such as red, blue, gold and silver can be included in the item 'color', respectively.

Next, in the user recommendation system, a user preference on each of the plurality of items for the product can be computed by use of the user behavior information collected (S121). As such, the user preference computed for each item can determine a ranking of a recommendation tree, which will be described later, and the computing of the user preference by use of the user behavior information (S121) is described below.

In order to compute a user preference by use of the collected user behavior information, the user recommendation system calculates a usability of the user behavior information. The usability of the user behavior information can be calculated by giving a score to each user behavior for one single product. Through the usability of the user behavior information calculated, we know how much the user behavior information collected can affect the user preference. In accordance with the present embodiment, the usability of the user behavior information can be calculated by giving a point score to each behavior information through the mathematical equation 1 below.

Usability=item_click+add_zoom+add_cart+add_buy

[Mathematical Equation 1]

Here, the word 'item_click' means that the user has clicked a certain product, and the word 'add_zoom' is an act of enlarging a photograph on a product description page that the user has clicked. The word 'add_cart' means that the user puts the product on a shopping basket, and the word 'add_buy' means an act of purchasing the product.

As the ones listed above, a point score can be given to each of the user behavior information. Then, a usability of the user behavior information can be calculated, and then the user preference can be computed based on the usability of the user behavior information (S122). In order to compute the user preference, an ID 3 algorithm can be used, and an entropy formula defined in the ID 3 algorithm is disclosed below. The entropy being employed in the present embodiment can be calculated again by applying the usability of the user behavior information to the entropy formula that follows below.

$$\text{Entropy}(S) = \sum_{i=1}^{c} -p_i \log_2 p_i$$

$$= -p_{u \geq 3} \log_2 p_{u \geq 3} - p_{u < 3} \log_2 p_{u < 3}$$

[Mathematical Equation 2]

It will be assumed hereinafter that the item of the product may affect a recommendation to the user when the usability of the user behavior information is greater than or equal to 3, and the mathematical Equation 2 can be a calculated result by dividing into two brackets, based on the usability '3'. However, the one above is only a particular embodiment, and it is apparent that the values for dividing the usability of the user behavior information can be smaller or greater than the usability '3' under different circumstances, which is generally understood by those with ordinary knowledge in the field of art to which the present invention belongs.

The letter 'S' is a sum of the total user behavior information collected, and the letter 'c' is a total number of the user behavior information, which belongs to S. The letter '$p_i$' is a ratio of the user behavior information, which belongs to a particular group 'i' among S.

If the number of the user behavior information collected from the user'behavior is 100 S, and if the number of objects having the usability greater than or equal to 3 are 70 among them, the entropy can be calculated as follows.

$$\text{Entropy}(S) = \frac{70}{100} \log_2 \frac{70}{100} - \frac{30}{100} \log_2 \frac{30}{100}$$

By using the entropy calculated above, a preference Gain (S, A) for each item of the product can be calculated. The formula for calculating the preference is as follows.

$$\text{Gain}(S, A) =$$

$$\text{Entropy}(S) - \sum_{v \in Values(A)} \frac{|S_v|}{|S|} \text{Entropy}(S_v)$$

[Mathematical Equation 2]

Here, Gain(S, A) is a preference for each product item, and v is an elemental value that belongs to each item. |S| is a total number of the behavior information collected, and |$S_v$| is a total number of the behavior information in accordance with the value v. Entropy($S_v$) is an entropy value in accordance with the value v, and Entropy(S) is the entropy calculated by the mathematical equation 2.

A recommendation tree can be created for determining the user's preference on a certain product, based on the preference calculated for each product item. When employing the recommendation method in accordance with the present embodiment, the preference of each rating item calculated through the mathematical equation 3 is shown in Table 1 below.

TABLE 1

| Rating item | Preference | Ranking |
|---|---|---|
| Category | 0.162 | 1 |
| Price | 0.151 | 2 |
| Style | 0.048 | 4 |
| Color | 0.035 | 5 |
| Material | 0.085 | 3 |

In other words, the values shown in Table 1 can be obtained by calculating the user preference through the mathematical equation 3 while computing the usability of the user behavior information in the user recommendation system. The ranking next to the reference column is a high ranking rate in accordance with the reference values. As shown in Table 1, The ranking of each item can indicate the user preference by calculating the reference values in accordance with the product items using the ID 3 algorithm.

The user recommendation system can calculate a conditional probability value for each element included in the plurality of items after computing a user preference on each of the plurality of items (S122). The user preference for each product item may differ in accordance with different products. For example, although the user prefers a yellow color, it does not mean the user always prefers the yellow color on every product. That means that the user preference can differ in accordance with the characteristics of the products. Therefore, it is important to determine what element the user prefers for each product by using the conditional probability.

The conditional probability, which calculates the likelihood or chance that a case A will happen under the condition whereby a case B has happened, can be defined as follows.

$$P(A \mid B) = \frac{P(B \mid A)P(A)}{P(B)}$$

Here, P(A|B) is a probability that the case A will happen under the condition whereby the case B has happened, and P(B|A) is a probability that the case B will happen under the condition whereby the case A has happened. P(A) is a probability that the case A will happen, and P(B) is a probability that the case B will happen. This will be described in more detail through an example whereby the conditional probability has been calculated in the e-commerce site for the accessories. Table 2 is a table that lists the conditional probability for the elements comprising each element under the same conditions as FIG. 1 described above.

TABLE 2

| | Rating Item | | Factor | Probability |
|---|---|---|---|---|
| Category | Necklace | Price | High-middle | 0.453 |
| | | | High | 0.351 |
| | | | Middle | 0.163 |

TABLE 2-continued

| Rating Item | | Factor | Probability |
|---|---|---|---|
| | Material | Gold | 0.453 |
| | | Silver | 0.265 |
| | | Brass | 0.112 |
| | Style | White Confidence | 0.473 |
| | | Back to nature | 0.271 |
| | | Sweet nostalgia | 0.201 |

If the necklace is the most preferred element that the user think among the category items, in accordance with the results of the preference rankings for the items calculated through the ID 3 algorithm, conditional probabilities of the rest elements comprising the items can be calculated.

Each of price, material and style consists of three elements. In case of price, it consists of a high-class, middle-class and high-middle-class in terms of prices. In case of material, it consists of gold, silver and brass. In case of style, it also consists of three elements. For example, in case of the necklace in the category item, the value '0.453' means that if you prefer the price of high-middle class, the probability that the case will happen under the condition is 0.453. The probability values listed in Table 2 are all the results computed by the conditional probability.

Next, a recommendation tree can be created for predicting a user preference of the user for a certain product by using the product's preference and the conditional probability values, which have been calculated (S130). The creating of the recommendation tree can include forming a hierarchy level by arranging the plurality of items in a descending order of the user preference (S131), and arranging the elements in a descending order of the conditional probability value, in which the elements is included in the plurality of items (S132).

In the present embodiment, the hierarchy level can be formed in a way that high-priority items are placed on top of the hierarchy level according to the calculated priority of the item depending on the user preference (S131). Referring to FIG. 1, the priority of the item according to the present embodiment can list category, price, materials, styles and colors in order. Therefore, the recommendation tree can be created by forming the hierarchy levels whereas the category placed on top of it, then the price, and then the materials, styles, colors, in order. The user recommendation system can completely create the recommendation tree by arranging each of the elements of the item, i.e. one level of the hierarchy levels, in a descending order of the conditional probability values from the left, after forming the recommendation tree's hierarchy level. However, if the recommendation tree is created by including all the items, a server of the e-commerce site may experience a heavy load due to each recommendation tree created by the user. In this embodiment, the hierarchy level is therefore created by including only three items having higher priority, and the recommendation tree can be created by reflecting only three elements, which are placed on the left of the hierarchy level and have higher conditional probability values.

Figure 3:
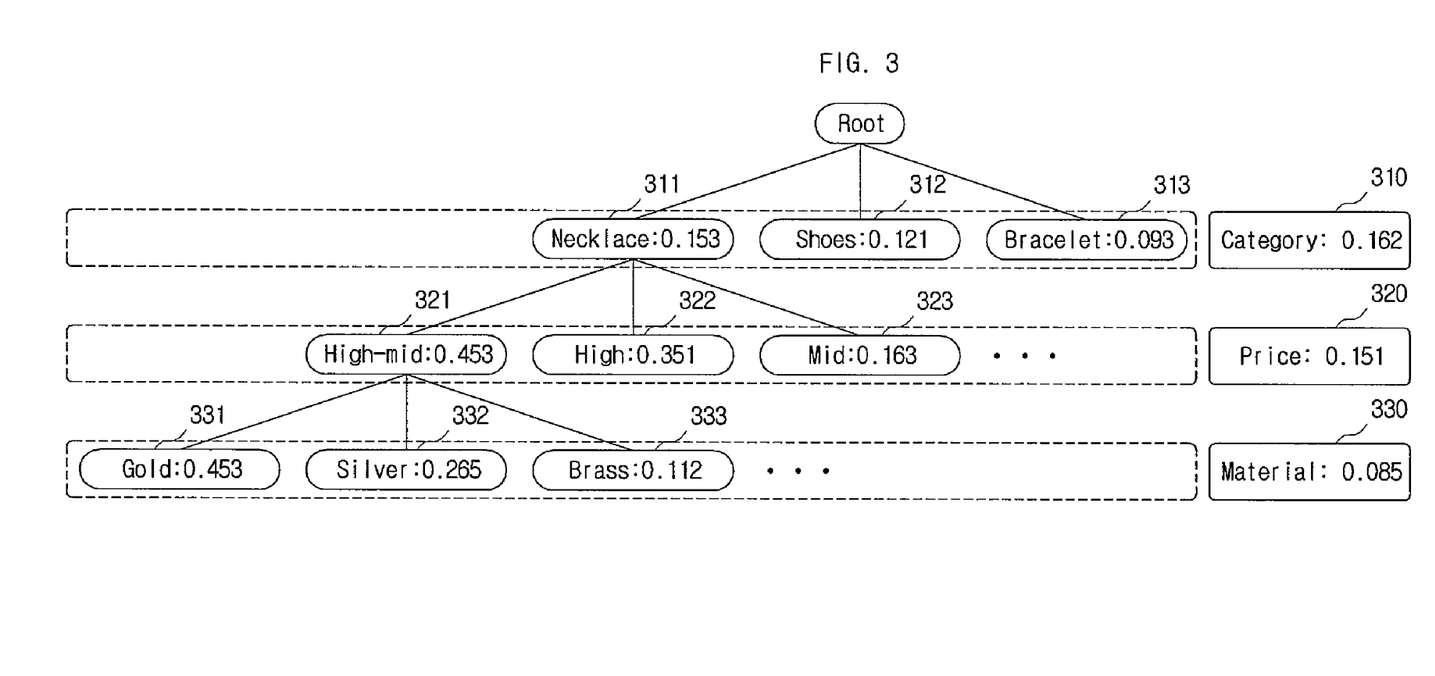
FIG. 3 is an example showing a recommendation tree created in accordance with a user recommendation method according to an embodiment of the present invention.

The recommendation tree created through such processes above is illustrated in FIG. 3. FIG. 3 is an example showing the recommendation tree created in accordance with the user recommendation method according to an embodiment of the present invention.

Generally, the hierarchy level is created in a descending order of higher priority of rating items. In accordance with FIG. 3, the hierarchy level can be formed in order of the category 310, price 320, materials 330. Here, the recommendation tree can be created by arranging each element on the left of the item whereas the category, which is the first level of the hierarchy levels, lists a necklace 311, shoes 312, bracelets 313 in a descending order of higher conditional probability values, the price, which is the second level, 320 lists high-middle 321, high 322, middle 323 in the same order above, and the materials 330, which is the last level, list gold 331, silver 332, brass 333 in the same order.

The recommendation tree has a purpose to determine what elements are the most preferred ones for the item when the user purchase a product. Thus, we can know a prediction vale about how much interest the user have for a certain product, through the recommendation tree. Here, the prediction vale about how much interest the user have for the certain product can be referred to the similarity between the user preference and the product. The similarity, between the user preference and the product, in the description has the same meaning hereinafter.

With reference to FIG. 1, the user recommendation system recommends the product to the user based on the recommendation tree created (S140).

The recommending of the product to the user based on the recommendation tree can include: calculating a similarity between the user preference and the product (S141); and recommending the product to the user in a descending order of the similarity. (S142).

In accordance with the present embodiment, the mathematical equation 4 below can be used for calculating the similarity between the user preference and the product by using the recommendation tree.

$$Sim(a) = (e_{d_1} \cdot p_{level_1}) + \qquad \text{[Mathematical Equation 4]}$$
$$(e_{d_2} \cdot p_{level_2}) + \ldots + (e_{d_n} \cdot p_{level_n})$$
$$= \sum_{k=1}^{n} e_{d_k} \cdot p_{level_n}$$

Sim(a) is the similarity between the user preference and the product, and $e_{d_k}$ is a conditional probability value for the element $d_k$, and $p_{level_n}$ is a similarity value for the item level$_n$.

First, a unit similarity for each item can be calculated for calculating the similarity between the user preference and the product. The unit similarity for each item is a value formed by multiplying the conditional probability value of the element corresponding to the product disposed in the hierarchy level and the preference of the item that contains the element. Then, the similarity between the user preference and the product can be calculated by adding the unit similarities calculated from each level of the hierarchy levels. In case of the necklace, for example, suppose that the price of it is about high-middle, the material of it is brass, the style of it is sweet, and the color of it is blue, and then the similarity between the user preference and the product for the necklace can be calculated in the description that follows.

$$Sim(\text{item}) = \{Necklace, High\text{-}mid, Brass, sweet, blue\}$$
$$= \{Category * Necklace + Price * High\text{-}mid +$$
$$Material * Brace + Style * Sweet + Color * Blue\}$$
$$= \{Category * Necklace + Price * High\text{-}mid +$$
$$Material * Brace\}$$
$$= 0.162 * 0.153 + 0.151 * 0.453 + 0.085 * 0.112$$
$$= 0.103$$

However, as mentioned earlier, the recommendation tree in accordance with the present embodiment only forms with the top three items and elements. Thus, the similarity can be computed by adding the unit similarities of the top three items and elements.

In other words, since the necklace belongs to the category item, a first unit similarity can be obtained by multiplying a preference of the category and a conditional probability value, which shows the likelihood or chance that the necklace will be chosen. A second unit similarity can be obtained by multiplying a preference of the price item and a conditional probability value, which indicates the chance of the high-middle price being chosen. A third unit similarity can be obtained by multiplying a preference of the material and a conditional probability value, which indicates the chance of the brass being chosen. A forth unit similarity can be obtained by multiplying a preference of the style and a conditional probability value, which indicates the chance of the sweet style being chosen. A fifth unit similarity can be obtained by multiplying a preference of the color and a conditional probability value, which indicates the chance of the blue color being chosen. Among them, the user recommendation system according to the present embodiment can obtain the similarity between the user preference and the product by adding the first, second and third unit similarities. However, it is to be appreciated that the number of the items and elements for calculating the unit similarity can be changed or modified without departing form the scope and spirit of the present invention.

For all products that are available in e-commerce sites, the similarity between the user preference and the product can be calculated in the same way as similar to the above. Each product can be arranged in a descending order of the similarity, and the product ranked on the top can be recommended to the user (S142).

As such, the recommendation method according the present embodiment performs the implicit analysis of the user's taste information, based on the user behavior information, and determines the relationship between the product's characteristic and the user preference by applying multiple items to each product. After that, the recommendation method recommends the product, to which the user may prefer, to the user.

Below, with reference to FIG. 2, we will take a look at a database, which stores the user behavior information collected through the user recommendation method, in accordance with the present embodiment of the invention. FIG. 2 is an example showing a user's behavior information of a user recommendation method in accordance with an embodiment of the present invention.

User_name refers to the name of the user accessed, Item_num represents the number of the item the user has clicked. Item_category, Item_price, Item_color, Item_material and Item_style are product information corresponding to the product's Item_num, and each of these makes the product's items.

As illustrated in FIG. 2, the number of the product the user has clicked and the characteristics of the category, price, colors, materials and styles of the product are marked with numbers.

Add_zoom, Add_cart and Add_buy represent the user behavior information. Here, the word item_click means that the user has clicked a certain product, and the word add_zoom is an act of enlarging a photograph on a product description page that the user has clicked. The word add_cart means that the user puts the product on a shopping basket, and the word add_buy is an act of purchasing the product.

As illustrated in FIG. 2, in order to know how much the user behavior information collected can affect the user preference, the usability of the user behavior information can be calculated. Thus, the method can recommend a product to the user by calculating the conditional probability and the similarity based on the one above.

Below, with reference to FIG. 4, we will take a look at the reliability of the user recommendation method in accordance with the present embodiment of the invention. FIG. 4 is a table, which shows a graded list of recommendations according to the number of the user behavior, in the user recommendation method in accordance with the present embodiment.

Through the graded list of recommendations based on the number of the user behavior information illustrated in FIG. 4, we can know how the results of the products recommended can be changed according to the number of the user behavior information. The transverse axis of the table shows the number of user behavior information collected, and the longitudinal axis of the table shows the number of products recommended to the user in order, in accordance with the number of the user behavior information.

As illustrated in FIG. 4, we can know that the recommended products are similar to each other when the user behaviors collected are 10 or when the user behaviors collected are 100. Every time an increase in user behavior, but a little change in ranking. Overall, the products located at a higher level form a group of top products, and the products located at a lower level form a group of low products. As such, both when the user behaviors are 10 and when the user behaviors are 100, it shows the lists of recommended products being recommended to the user are similar to each other. That means, even if you do not have much information on the user's behavior as the user first visits to the site, the method can provide effective recommendation to the user in accordance with the present embodiment of the invention.

The user recommendation method, as disclosed using the present embodiment, can be tangibly implemented as a recorded medium readable by a computer, etc., that stores a program of instructions executable by the computer, etc. The recorded medium readable by the computer can include each of program instructions, data files and data structures, or a combination of the ones above.

The program instructions that are written to the medium readable by the computer can be specially designed and configured for the present invention, or can be those available, which are generally understood by those with ordinary knowledge in the field of computer software. The medium readable by the computer, for example, can be a hard disk, floppy disk, magnetic media such as a magnetic tape, CD-ROM, optical media such as DVD, magneto-optical media such as a floptical disk and hardware device, such as a ROM, RAM and flash memory, which are configured to store and perform the program instructions. In addition to the above, the recorded medium can be a program instruction and a ray of light including a carrier wave that sends a signal specifying the data structure, or can be a transmission media such as a metal line and waveguide. Examples of the program instruction can include a machine code, such as those created by a compiler, as well as a high-level language code executable by the computer using an interpreter.

The hardware device mentioned above can be configured to work as one or more of software modules, to perform actions of the present invention.

According to certain aspects of the invention as set forth above, the method can more quickly and accurately analyze the user's preferences while not inconveniencing the user.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention. As such, many embodiments other than those set forth above can be found in the appended claims.

What is claimed is:

1. A method of recommending a product to a user of an e-commerce site selling the product through the Internet, the product being recommended in a user recommendation system, the method comprising the steps of:

collecting user behavior information, wherein the user behavior information is comprised within a command signal inputted using an input device by the user in communication with the e-commerce site while the input device is accessing the e-commerce site in the user recommendation system;

computing a user preference on each of a plurality of items using usefulness of the user behavior information in the user recommendation system, wherein the product is classified into a plurality of items representing the product;

calculating a conditional probability value for each element included in the plurality of items in the user recommendation system;

creating a recommendation tree for predicting a user preference of the user for the product, the user preference of the user for the product being predicted based on the user preference on each of the plurality of items and the conditional probability value in the user recommendation system; and recommending the product to the user based on the recommendation tree in the user recommendation system, wherein the computing of the user preference uses an ID 3 algorithm and comprises:

calculating the usefulness by giving a score to the user behavior information in the user recommendation system; and computing the user preference on each of the plurality of items based on the usefulness of the user behavior information in the user recommendation system, wherein an equation for computing the user preference on each of the plurality of items is $Entropy(S) = -p_{u \geq 3} \log_2 p_{u \geq 3} - p_{u<3} \log_2 p_{u<3}$, and wherein $Entropy(S)$ is the user preference on each of the plurality of items, $p_{u \geq 3}$ is a probability when the usefulness of the user behavior information is greater than or equal to 3, and $p_{u<3}$ is a probability when the usefulness of the user behavior information is smaller than 3.

2. The method of claim 1, wherein the creating of the recommendation tree in the user recommendation system comprises the steps of:

forming a hierarchy level by arranging the plurality of items in a descending order of the user preference in the user recommendation system; and arranging the elements in a descending order of the conditional probability value, the elements being included in the plurality of items in the user recommendation system.

3. The method of claim 1, wherein the recommending of the product to the user based on the recommendation tree in the user recommendation system comprises the steps of:
calculating a similarity between the user preference and the product in the user recommendation system; and
recommending the product to the user in a descending order of the similarity in the user recommendation system.

4. The method of claim 3, wherein the calculating of the similarity in the user recommendation system comprises the steps of:
computing a unit similarity by multiplying the preference of a hierarchy level and the conditional probability value of the element, the element corresponding to the product disposed in the hierarchy level in the user recommendation system; and
computing the similarity by adding the unit similarities in the user recommendation system.

5. A computer program product embodied in a non-transitory computer readable medium, the computer program for executing a method of recommending a product to a user of an e-commerce site selling the product through the Internet, the product being recommended in a user recommendation in system, when executed by a computer performs the steps of:
collecting user behavior information, wherein the user behavior information is comprised within a command signal inputted using an input device by the user in the e-commerce site while the input device is accessing the e-commerce site in the user recommendation system;
computing a user preference on each of a plurality of items using usefulness of the user behavior information in the user recommendation system, wherein the product is classified into a plurality of items representing the product;
calculating a conditional probability value for each element included in the plurality of items in the user recommendation system;
creating a recommendation tree for predicting a user preference of the user for the product, the user preference of the user for the product being predicted based on the user preference on each of the plurality of items and the conditional probability value in the user recommendation system; and
recommending the product to the user based on the recommendation tree in the user recommendation system,
wherein the computing of the user preference uses an ID 3 algorithm and comprises in the user recommendation system:
calculating the usefulness by giving a score to the user behavior information in the user recommendation system; and
computing the user preference on each of the plurality of items based on the usefulness of the user behavior information in the user recommendation system,
wherein an equation for computing the user preference on each of the plurality of items is $\text{Entropy}(S) = -p_{u \geq 3} \log_2 p_{u \geq 3} - p_{u<3} \log_2 p_{u<3}$, and wherein $\text{Entropy}(S)$ is the user preference on each of the plurality of items, $p_{u \geq 3}$ is a probability when the usefulness of the user behavior information is greater than or equal to 3, and $p_{u<3}$ is a probability when the usefulness of the user behavior information is smaller than 3.

6. The computer program product within the computer readable medium of claim 5, wherein the creating of the recommendation tree in the user recommendation system comprises the steps of:
forming a hierarchy level by arranging the plurality of items in a descending order of the user preference in the user recommendation system; and
arranging the elements in a descending order of the conditional probability value, the elements being included in the plurality of items in the user recommendation system.

7. The computer program product within the computer readable medium of claim 5, wherein the recommending of the product to the user based on the recommendation tree in the user recommendation system comprises the steps of:
calculating a similarity between the user preference and the product in the user recommendation system; and
recommending the product to the user in a descending order of the similarity in the user recommendation system.

8. The computer program product within the computer readable medium of claim 7, wherein the calculating of the similarity in the user recommendation system comprises the steps of:
computing a unit similarity by multiplying the preference of a hierarchy level and the conditional probability value of the element, the element corresponding to the product disposed in the hierarchy level in a user recommendation system; and
computing the similarity by adding the unit similarities in a user recommendation system.

* * * * *